United States Patent
Policicchio

(10) Patent No.: US 11,045,061 B2
(45) Date of Patent: Jun. 29, 2021

(54) METHOD OF MAKING A TUFTED LAMINATED CLEANING ARTICLE

(71) Applicant: The Procter & Gamble Company, Cincinnati, OH (US)

(72) Inventor: Nicola John Policicchio, Mason, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 16/127,261

(22) Filed: Sep. 11, 2018

(65) Prior Publication Data

US 2019/0075995 A1    Mar. 14, 2019

Related U.S. Application Data

(63) Continuation-in-part of application No. 15/700,384, filed on Sep. 11, 2017, and a continuation-in-part of application No. 15/700,396, filed on Sep. 11, 2017.

(30) Foreign Application Priority Data

Sep. 25, 2017 (EP) .................... 17192874

(51) Int. Cl.
*A47L 13/00* (2006.01)
*B32B 5/00* (2006.01)
(Continued)

(52) U.S. Cl.
CPC .......... *A47L 13/16* (2013.01); *A47L 11/4036* (2013.01); *B08B 1/00* (2013.01); *B08B 1/002* (2013.01); *B08B 1/006* (2013.01); *B32B 3/16* (2013.01); *B32B 5/022* (2013.01); *B32B 37/18* (2013.01); *B32B 38/0004* (2013.01); *A47L 2201/00* (2013.01); *B32B 2038/045* (2013.01);
(Continued)

(58) Field of Classification Search
CPC .......... A47L 13/16; A47L 13/38; A47L 13/40; A47L 13/44; A47L 13/20; Y10T 156/1064; Y10T 156/1075; Y10T 153/1075; Y10T 156/1077; Y10T 156/1082; Y10T 156/1092; B32B 38/185; B32B 37/22; B08B 1/00; B08B 1/002; B08B 1/006
See application file for complete search history.

(56) References Cited

U.S. PATENT DOCUMENTS 823,725 A    6/1906 Hayden
4,145,787 A    3/1979 Bastian
(Continued)

FOREIGN PATENT DOCUMENTS

EP    0923902 A2    6/1999
WO    WO 00/35334    6/2000

OTHER PUBLICATIONS

EP Search Report for application No. 17192856.7-1018, dated May 9, 2018, 7 pages.
(Continued)

*Primary Examiner* — Linda L Gray
(74) *Attorney, Agent, or Firm* — John T. Dipre

(57) ABSTRACT

A method of making a cleaning article. The cleaning article has discrete tufts of tow fibers. The discrete tufts are unequally spaced from adjacent tufts, to provide improved collection and retention of debris from a target surface. The cleaning article may be made by cutting a precursor sheet having tufts into discrete portions. The discrete portions are then bonded to a carrier sheet.

11 Claims, 10 Drawing Sheets

(51) Int. Cl.

| | | |
|---|---|---|
| *B32B 3/00* | (2006.01) | |
| *B32B 1/00* | (2006.01) | |
| *B32B 37/00* | (2006.01) | |
| *B32B 38/00* | (2006.01) | |
| *A47L 13/16* | (2006.01) | |
| *B32B 5/02* | (2006.01) | |
| *B32B 3/16* | (2006.01) | |
| *B08B 1/00* | (2006.01) | |
| *B32B 37/18* | (2006.01) | |
| *A47L 11/40* | (2006.01) | |
| *B32B 38/04* | (2006.01) | |

(52) U.S. Cl.
CPC ....... *B32B 2305/22* (2013.01); *B32B 2432/00* (2013.01); *Y10T 156/1064* (2015.01); *Y10T 156/1075* (2015.01); *Y10T 156/1077* (2015.01); *Y10T 156/1082* (2015.01); *Y10T 156/1092* (2015.01)

(56) References Cited

U.S. PATENT DOCUMENTS

| | | | |
|---|---|---|---|
| 4,752,540 | A | 6/1988 | Chua |
| 5,691,035 | A | 11/1997 | Chappell et al. |
| 6,143,393 | A | 11/2000 | Abe et al. |
| 6,241,835 | B1 | 6/2001 | Abe et al. |
| 6,245,413 | B1 | 6/2001 | Fujiwara et al. |
| 6,319,593 | B1 | 11/2001 | Kenmochi et al. |
| 6,329,308 | B1 | 12/2001 | Kenmochi et al. |
| 6,506,472 | B1 | 1/2003 | Tanaka et al. |
| 6,550,092 | B1 | 4/2003 | Brown et al. |
| 6,554,937 | B1 | 4/2003 | Kenmochi et al. |
| 6,774,070 | B1 | 8/2004 | Kenmochi et al. |
| 6,777,064 | B1 | 8/2004 | Brown et al. |
| 6,797,357 | B2 | 9/2004 | Fereshtehkhou et al. |
| 6,813,801 | B2 | 11/2004 | Tanaka et al. |
| 6,830,801 | B1 | 12/2004 | Kenmochi et al. |
| 6,936,330 | B2 | 8/2005 | Fereshtehkhou et al. |
| 6,984,615 | B2 | 1/2006 | Kenmochi et al. |
| 7,003,856 | B2 | 2/2006 | Hayashi et al. |
| 7,291,359 | B2 | 11/2007 | Haskett et al. |
| 7,386,907 | B2 | 6/2008 | Otsuka et al. |
| 7,560,398 | B2 | 7/2009 | Zillig et al. |
| 7,566,671 | B2 | 7/2009 | Hoadley et al. |
| 7,681,275 | B2 | 3/2010 | Lin et al. |
| 7,682,686 | B2 | 3/2010 | Curro et al. |
| 7,712,178 | B2 | 5/2010 | Yamada |
| 7,779,502 | B2 | 8/2010 | Fujiwara et al. |
| 7,786,030 | B2 | 8/2010 | Tsuchiya |
| 7,803,726 | B2 | 9/2010 | Policicchio |
| 7,838,099 | B2 | 11/2010 | Curro et al. |
| 7,870,635 | B2 | 1/2011 | Yamada et al. |
| 7,937,797 | B2 | 5/2011 | Tsuchiya et al. |
| 8,075,977 | B2 | 12/2011 | Curro et al. |
| 8,146,197 | B2 | 4/2012 | Yamada |
| 8,151,402 | B2 | 4/2012 | Takabayashi et al. |
| 8,161,001 | B2 | 4/2012 | Di Carlo et al. |
| 8,161,594 | B2 | 4/2012 | Policicchio et al. |
| 8,186,001 | B2 | 5/2012 | Tsuchiya |
| 8,225,453 | B2 | 7/2012 | Yamada |
| 8,245,349 | B2 | 8/2012 | Tsuchiya et al. |
| 8,528,151 | B2 | 9/2013 | Przepasniak |
| 8,536,074 | B2 | 9/2013 | Fereshtehkhou et al. |
| 8,617,685 | B2 | 12/2013 | Yamada |
| 8,646,144 | B2 | 2/2014 | Wada et al. |
| 8,752,232 | B2 | 6/2014 | Otsuka et al. |
| 8,756,746 | B2 | 6/2014 | Policicchio |
| 8,763,197 | B2 | 7/2014 | Policicchio et al. |
| 8,793,832 | B2 | 8/2014 | Yamada |
| 8,851,776 | B2 | 10/2014 | Schwarz et al. |
| 8,893,347 | B2 | 11/2014 | Przepasniak |
| 9,113,768 | B2 | 8/2015 | Wada et al. |
| 9,198,553 | B2 | 12/2015 | Policicchio |
| 9,204,775 | B2 | 12/2015 | Pung et al. |
| 9,296,176 | B2 | 3/2016 | Escaffre et al. |
| 9,339,165 | B2 | 5/2016 | Vetter et al. |
| 9,533,822 | B2 | 1/2017 | Policicchio |
| 9,974,424 | B2 | 5/2018 | Roe et al. |
| 10,632,221 | B2 | 4/2020 | Nwachukwu |
| 10,730,081 | B2 | 8/2020 | Policicchio |
| 2006/0171764 | A1 | 8/2006 | Hoadley et al. |
| 2007/0084005 | A1 | 4/2007 | Lin |
| 2008/0028560 | A1 | 2/2008 | Policicchio |
| 2013/0340191 | A1 | 12/2013 | Przepasniak |
| 2014/0224698 | A1 | 8/2014 | Policicchio |
| 2014/0366293 | A1 | 12/2014 | Roe |
| 2017/0274110 | A1 | 9/2017 | Nwachukwu |
| 2019/0076886 | A1 | 3/2019 | Policicchio |

OTHER PUBLICATIONS

EP Search Report for application No. 17192874.0-1018, dated May 9, 2018, 7 pages.
U.S. Appl. No. 16/127,260, filed Sep. 11, 2018, Nicola John Policicchio.
All Office Actions, U.S. Appl. No. 16/127,260.
International Search Report and Written Opinion; Application Ser. No. PCT/US2018/050195; dated Jan. 8, 2019, 12 pages.

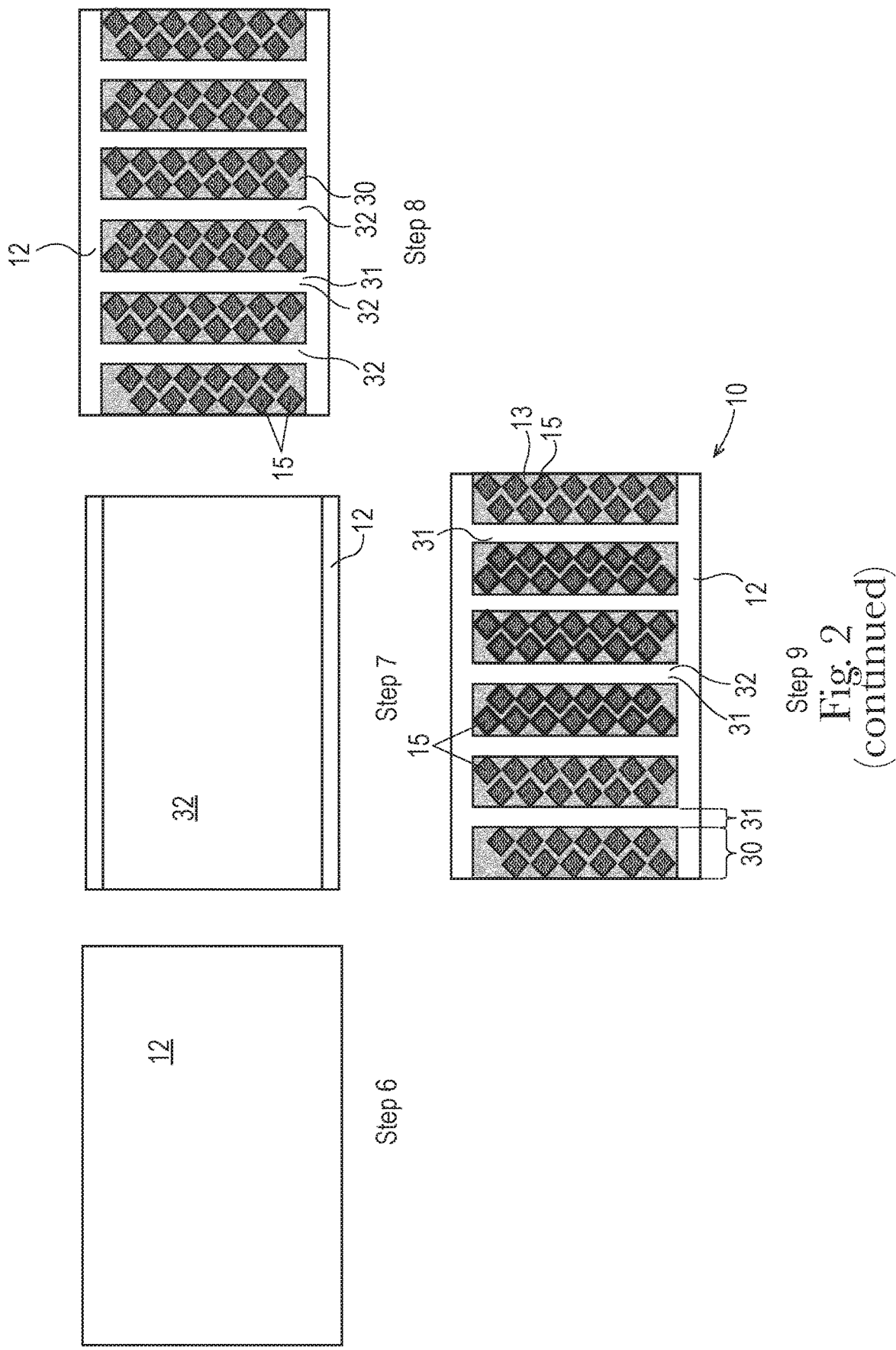

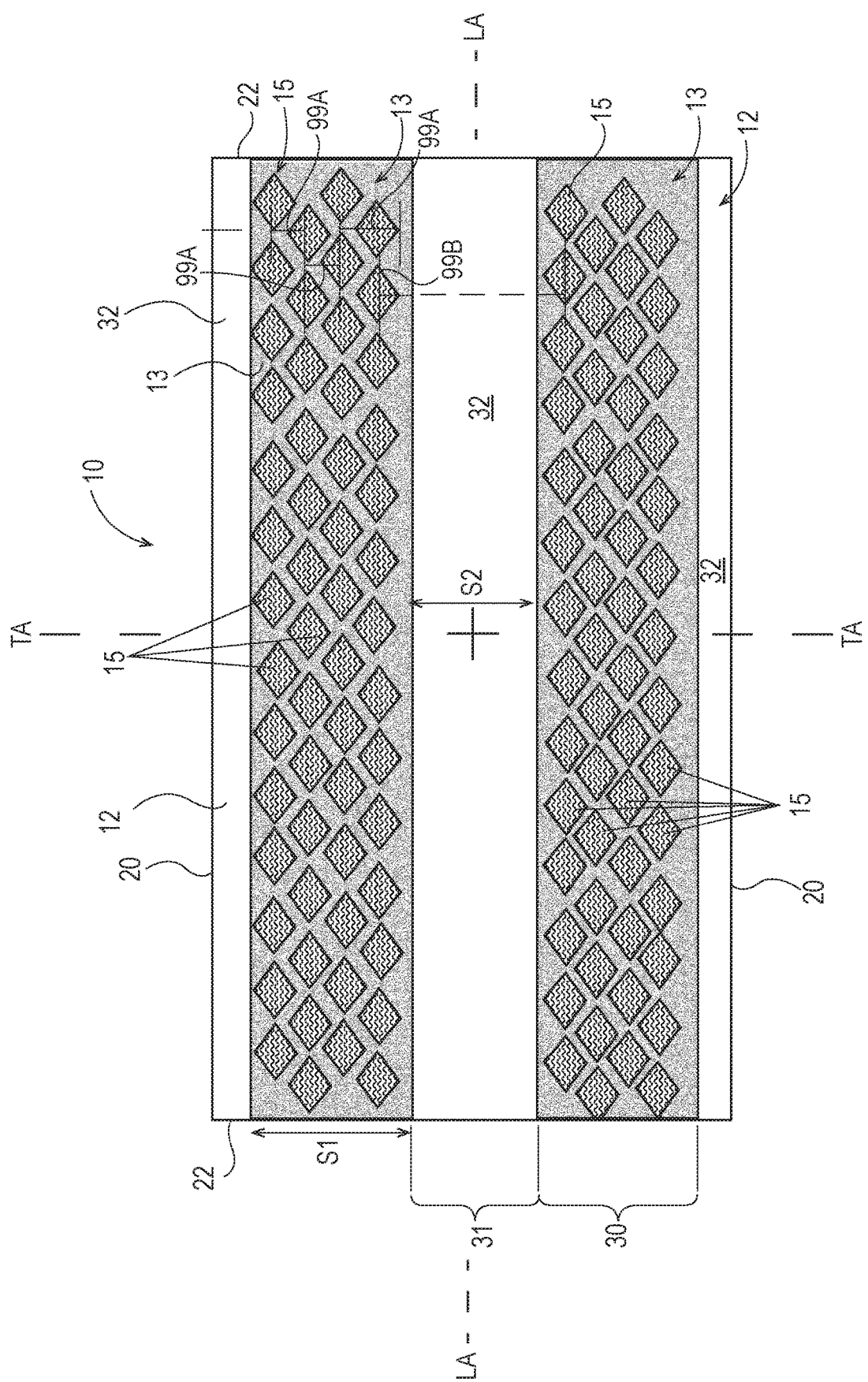
Fig. 3.1

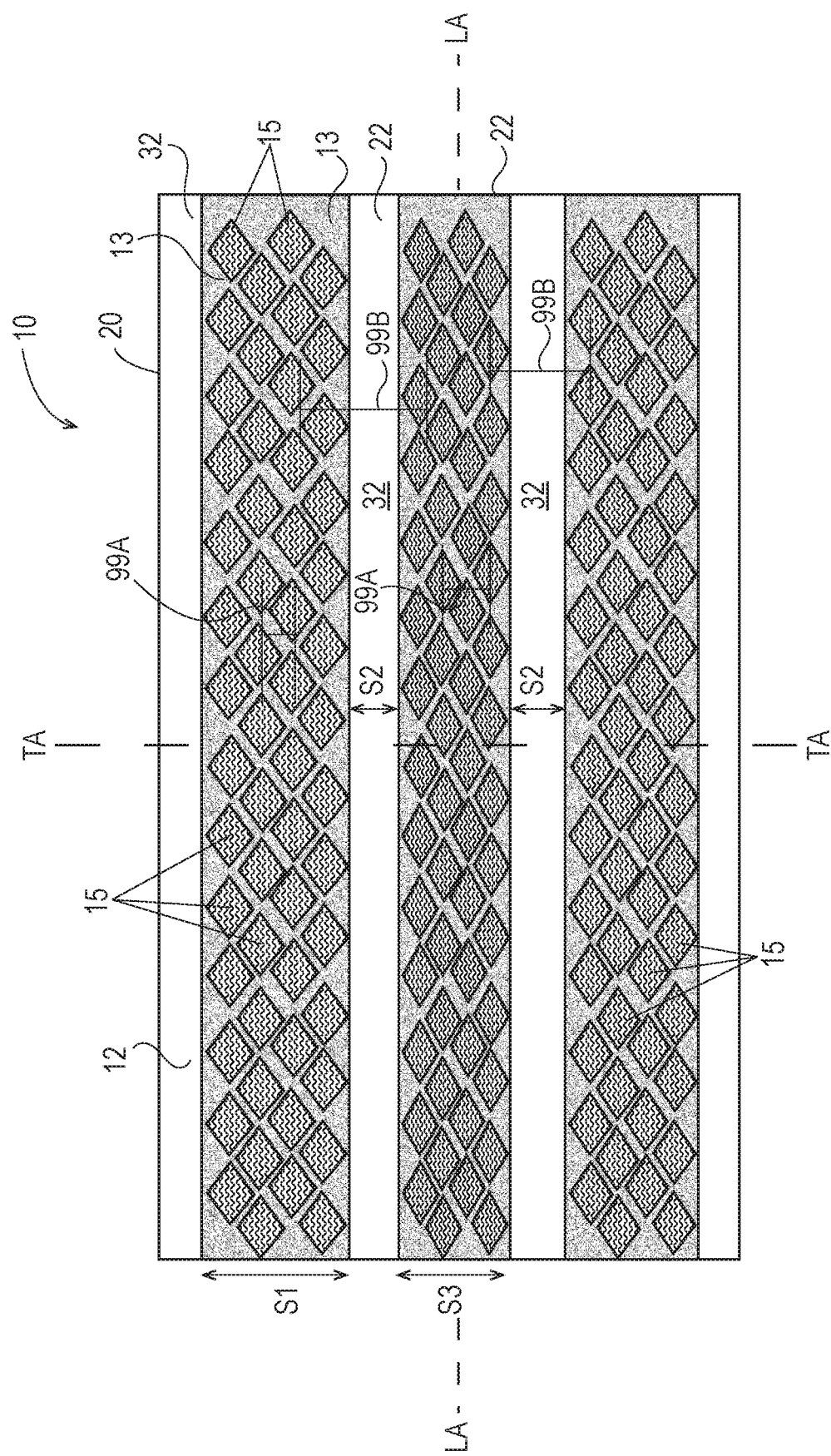
Fig. 3.2

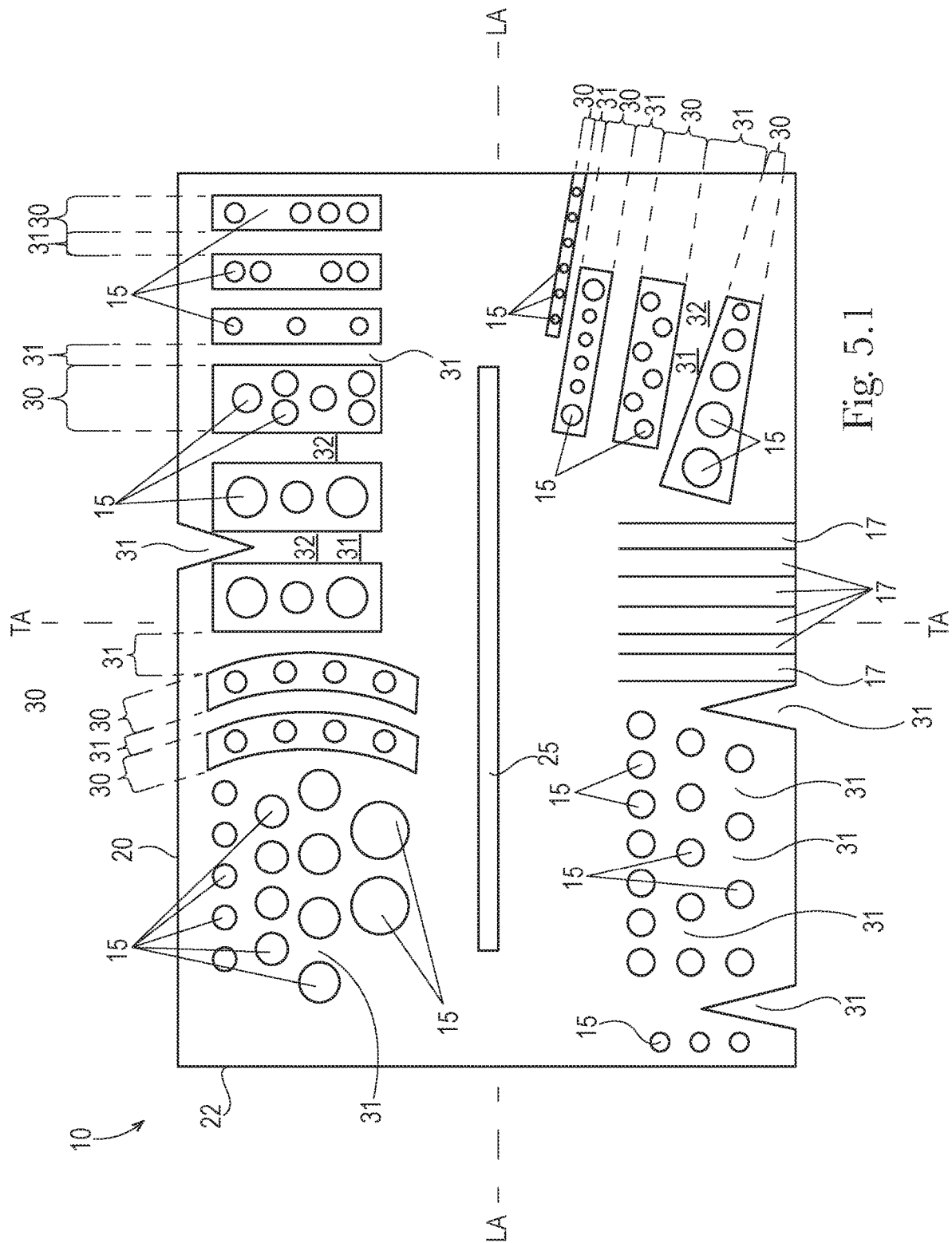
Fig. 5.1

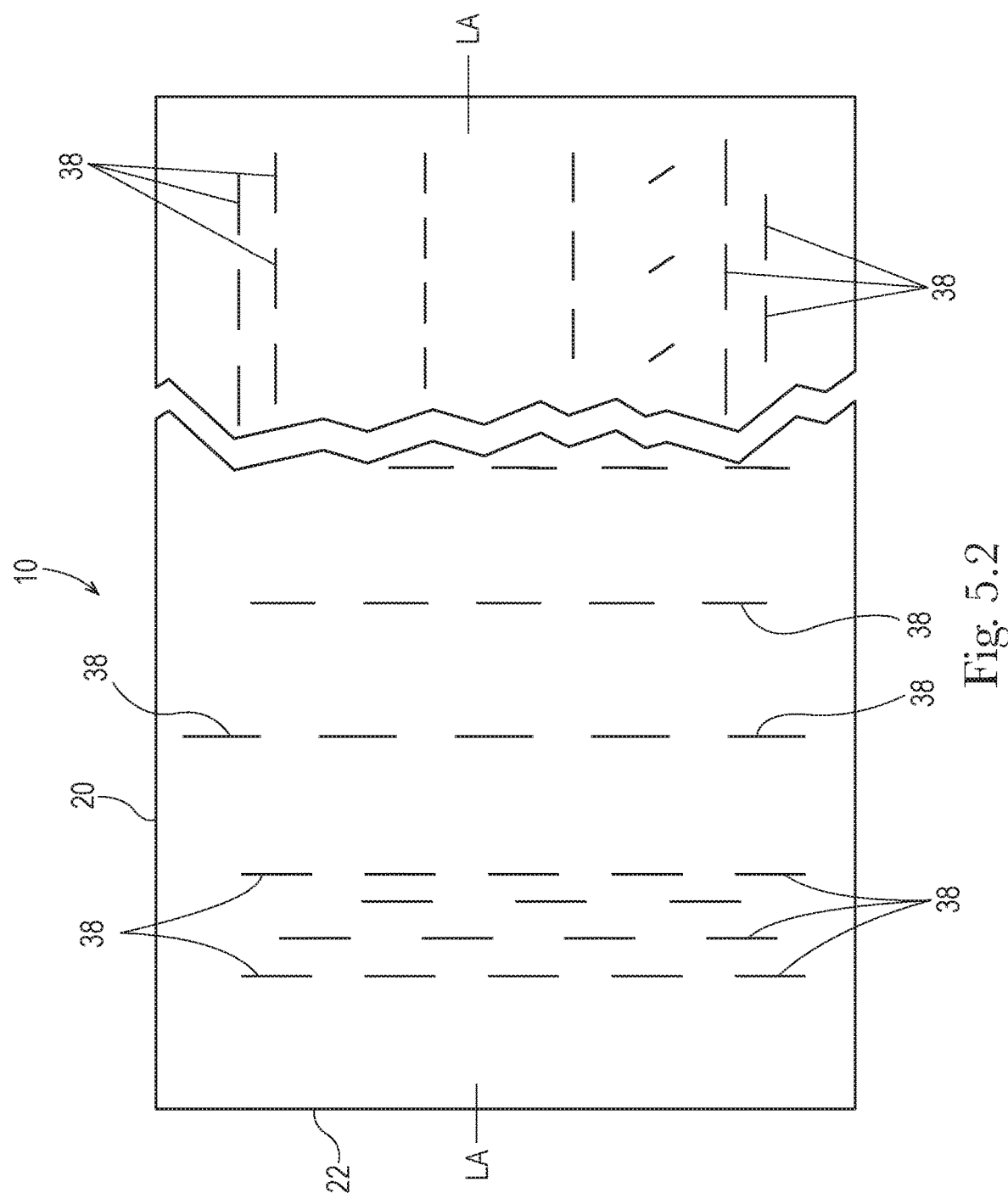
Fig. 5.2

METHOD OF MAKING A TUFTED LAMINATED CLEANING ARTICLE

FIELD OF THE INVENTION

The present invention relates to cleaning articles having irregularly spaced tufts of tow fibers for cleaning.

BACKGROUND OF THE INVENTION

Various cleaning articles have been created for dusting and light cleaning. For example, cloth rags and paper towels used dry or wetted with polishing and cleaning compositions have been used on relatively flat surfaces such as countertops, showers, sinks and floors. Laminiferous wipes have been proposed, as disclosed in U.S. Pat. No. 9,296,176. But, rags, wipes, and paper towels are problematic for reasons such as hygiene (the user's hands may touch chemicals, dirt or the surface during cleaning), reach (it may be difficult to insert the user's hand with the rag, wipe or paper towel into hard-to-reach places) and inconvenience (cleaning between closely-spaced articles typically requires moving the articles).

To overcome the problems associated with using rags and paper towels, various reusable dust gathering devices using felt and hair have been utilized for more than a century, as illustrated by U.S. Pat. No. 823,725 issued in 1906 to Hayden and using yarns as illustrated in U.S. Pat. No. 4,145,787. To address the problems with reusable dust gathering devices, disposable cleaning articles have been developed which have limited re-usability. These disposable cleaning articles may include synthetic fiber tufts, called tow fibers, attached to a sheet as shown in 2006/0171764; U.S. Pat. Nos. 6,143,393; 6,241,835; 6,319,593; 6,329,308; 6,554,937; 6,774,070; 6,813,801; 6,830,801; 6,984,615; 7,003,856; 7,566,671; 7,712,178; 7,779,502; 7,870,635; 7,937,797; 8,146,197; 8,151,402; 8,161,594, 8,186,001; 8,225,453; 8,245,349; 8,646,144; 8,528,151; 8,617,685; 8,646,144; 8,752,232; 8,756,746; 8,763,197; 8,793,832; 9,113,768; 9,198,553 and in commonly assigned U.S. Pat. No. 8,075,977.

Disposable dusters having tow fibers may provide for wet cleaning as disclosed in U.S. Pat. No. 7,566,671 and in commonly assigned U.S. Pat. No. 7,803,726 and commonly assigned US 2008/0028560. But tow fibers may become matted when wet and not be suitable for cleaning a large or heavily wetted surface, such as a floor. Thus, dusters may not suitable for cleaning extremely large or heavily soiled surfaces.

Thus various sheets have been proposed for cleaning larger target surfaces, such as floors. Webs with elastic behavior have been proposed in commonly assigned U.S. Pat. No. 5,691,035. Sheets with recesses have also been proposed, as disclosed in U.S. Pat. Nos. 6,245,413; and 7,386,907. Sheets with cavities have been proposed, as disclosed in U.S. Pat. No. 6,550,092. An adhesive cleaning sheet is proposed in U.S. Pat. No. 7,291,359. Tufts are taught in commonly assigned U.S. Pat. Nos. 7,682,686, 7,838,099 and/or 8,075,977. Yet other attempts use coatings of wax and/or oil. Coatings, such as wax and oil are generally disclosed in U.S. Pat. Nos. 6,550,092; 6,777,064; 6,797,357; 6,936,330; 6,984,615; 7,386,907; 7,560,398; 7,786,030; 8,536,074; 9,204,775; 9,339,165. Specific amphiphilic coatings are disclosed in U.S. Pat. No. 8,851,776.

Some of the prior art attempted to focus on debris as simply large and small, based upon the size of the debris intended to be collected. But these teachings do not always address the proper use of tow fibers to collect the range of debris commonly found when cleaning a floor. Dense, granular debris, such as dirt, is not necessarily captured by tow fibers. Low density, more voluminous debris, such as hair, is not necessarily captured by nonwovens. Prior art attempts to incorporate tow fibers into cleaning sheets did not account for such differences in volume and density. Tow fibers which are too closely spaced may not intercept and hold the more voluminous, lower density debris. Tow fibers which are spaced too far apart may not even come in contact with dense, granular debris-much less clean such debris from the surface. Even if such debris is initially captured, prior art sheets have not addressed the problem of how to retain such debris by the sheet.

Accordingly, this invention addresses the problem of how to incorporate tow fibers into a hard surface cleaning article for capture and retention of the wide range of debris encountered in everyday cleaning by through the preferential placement of tow tufts on a cleaning sheet.

SUMMARY OF THE INVENTION

The invention comprises a method of making a cleaning article having discrete, irregularly spaced tufts of tow fibers. The method comprises the steps of: providing a precursor sheet having discrete tufts of tow fibers disposed thereon, cutting the precursor sheet into a plurality of discrete portions, and bonding at least some of said discrete portions of said precursor sheet and said tufts to a carrier sheet to provide a laminate with said tufts extending outwardly to form a cleaning article for cleaning a target surface with said tufts.

BRIEF DESCRIPTION OF THE DRAWINGS

FIG. 3.1 is a schematic top view of a cleaning article according to the present invention and having two rows of discrete tufts, one row being disposed on either side of the longitudinal axis, and having a center space therebetween, the center space disposed on the longitudinal axis.

FIG. 3.2 is a schematic top view of a cleaning article according to the present invention and having three rows of discrete tufts, one row being disposed on either side of the longitudinal axis, and having a center row therebetween, the center row being disposed on the longitudinal axis.

FIG. 5.1 is a schematic top view of a hybrid cleaning article according to the present invention and having discrete tufts, with the features of FIGS. 1-4 and further having flexible strips and a center cleaning strip element.

FIG. 5.2 is a broken schematic bottom view of a cleaning article according to the present invention, showing a bond pattern aligned with the transverse axis on the left side of the cleaning article and a bond pattern aligned with the longitudinal axis and skewed relative thereto on the right side of the cleaning article.

DETAILED DESCRIPTION OF THE INVENTION

Figure 1:
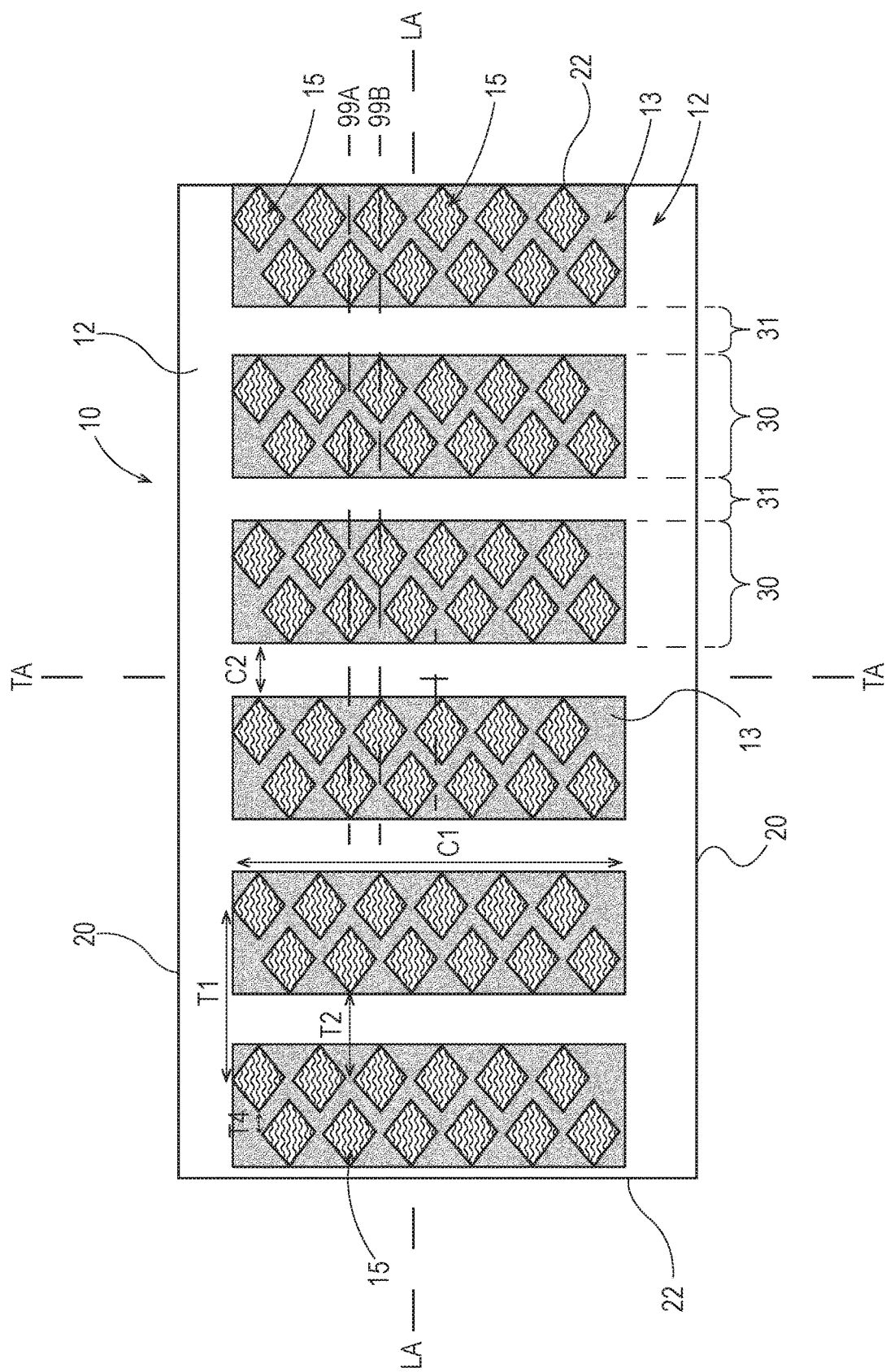
FIG. 1 is a schematic top view of a cleaning article according to the present invention and having discrete tufts, spaced in rows.

Referring to FIGS. 1-5.2, the cleaning article 10 may be generally elongate, and rectangular, although other shapes are contemplated and feasible. The cleaning article 10 may comprise two or more components joined in a laminate form to provide cleaning article 10 suitable for floor cleaning. The cleaning article 10 may have a carrier sheet 12, which forms a chassis for attachment of other components thereto. The cleaning article 10 has a plurality of tufts 15. The tufts 15 are disposed in rows 30, with spaces 31 between the rows 30. The spaces 31 may be arranged in lanes, providing distance between the rows 30 of tufts 15. This arrangement provides for advantageous debris collection and retention over the uniform tuft 15 geometry found in the prior art.

The cleaning article 10 may be disposable. By disposable it is meant that the cleaning article 10 may be used for one cleaning task, or generally for not more than several square meters, then discarded. In contrast, a reusable cleaning article 10 is laundered or otherwise restored after use.

The cleaning article 10 may have a longitudinal axis LA and a transverse axis TA orthogonal thereto. The cleaning article 10, and respective components thereof, may have two longitudinal edges 20 parallel to the longitudinal axis LA and two transverse edges 22 parallel to the transverse axis TA.

The length of the cleaning article 10 is taken in the longitudinal direction. The width of the cleaning article 10 corresponds to the transverse direction perpendicular to the length direction and disposed within the plane of the sheet 12. The thickness is defined as the dimension in the Z-direction. The XY plane is defined as the plane defined by the cleaning article 10. The Z-direction of the cleaning article 10 is the direction perpendicular to the plane of the cleaning article 10. The cleaning article 10 may have a length from 20 to 50 cm and a width of 10 to 20 cm. The cleaning article 10 may particularly be 30+/−2 cm long by 14+/−2 cm wide, as measured at the greatest dimensions, in order to fit the head 74 of a typical cleaning implement 70, as discussed below. An optional core may particularly have a width of 6.5+/−2 cm and a length of 26+/−2 cm. Of course, one of skill will recognize that other shapes are feasible and within the scope of the present invention.

The cleaning article 10 may have an outwardly facing cleaning side and an attachment side opposed thereto. The cleaning article 10 is intended to be used dry, although wet cleaning is contemplated and within the scope of the present invention. The cleaning article 10 may also have an optional absorbent core for wet cleaning.

More particularly, the cleaning article 10 may comprise a construction of at least one tow fiber tuft 15 and at least one carrier sheet 12. The tow fiber tuft 15 and carrier are joined in face-to-face relationship with at least one permanent bond 38 to form a laminate. The tow fiber tuft(s) 15 may be distended from and protrude outwardly from the plane of the carrier sheet 12.

The tufts 15 may be disposed directly on a carrier sheet 12. Optionally, the tufts 15 may be bonded to a precursor sheet 13, which in turn, is joined to a carrier sheet 12 as described below.

The carrier sheet 12 and/or precursor sheet 13 may particularly comprise a synthetic nonwoven. A carrier sheet 12 and/or precursor sheet 13 having synthetic fibers provides for convenient joining of the tow fibers thereto. Nonwovens include spun bonded, carded and airlaid materials, as are known in the art and made from synthetic fibers. A suitable nonwoven sheet may be made according to commonly assigned U.S. Pat. No. 6,797,357. The carrier sheet 12 and/or precursor sheet 13 may optionally comprise a polyolefinic film, or a microfiber and be liquid pervious or impervious.

The carrier sheet 12 and/or precursor sheet 13 may comprise cellulose, to provide absorptive capacity. A cellulosic sheet may have permanent wet strength resin added thereto, as is known in the art. Or the carrier sheet 12 and/or precursor sheet 13 may preferably comprise a mixture of cellulosic and synthetic fibers, to provide both absorptive and barrier properties, and for convenient joining of the cleaning strip element 25. By cellulosic it is meant that the component comprises a predominant weight percentage of cellulosic fibers.

The carrier sheet 12 and/or precursor sheet 13 may comprise a hydroentangled spunbond nonwoven with a basis weight of 20 to 80 gsm. A 45 gsm nonwoven from Avgol Nonwovens of Tel-Aviv, Israel has been found suitable. The carrier sheet 12 and/or precursor sheet 13 may comprise a laminate of two, three or more plies joined together using adhesive 32 and/or thermal bonds 38 as are known in the art. Optional attachment stripes of loop or similar material may be joined to the attachment side to removably join the cleaning article 10 to a handle 72 or implement 70. One or more plies may comprise a microfiber, particularly a nylon microfiber, as is known in the art.

The cleaning article 10 may have an optional cleaning strip element 25. Particularly, the carrier sheet 12 may serve as a chassis for attachment of the cleaning strip element 25 thereto. The cleaning strip element 25 may comprise a polyolefinic film, having integral protrusions as disclosed in commonly assigned U.S. Pat. No. 8,407,848 or a rope of tow fibers. The cleaning strip element 25 may preferably comprise a mixture of wet laid fibers formed into a tissue which is bonded onto a synthetic nonwoven using a process such as spun lace or hydroentangling. The cleaning element 25 may particularly comprise a 23 gsm tissue with a 17 gsm polypropylene spunbond as a composite, sold under the name Genesis tissue by Suominen of Helsinki, Finland. Or, the cleaning strip element 25, precursor sheet 13 and/or the carrier sheet 12 may alternatively or additionally comprise nylon microfiber.

The tow fibers, and tufts 15 formed therewith, may be synthetic, comprising polymers including polyester, polypropylene, polyethylene, bio-derived polymers such as polylactic acid, bio-polyethylene, bio-polyester and the like. Tow fibers may also include fibers from natural sources such as cellulose, cellulose acetate, flax, hemp, jute and mixtures thereof manufactured wherein the individual fibers are relatively long strands manufactured in bundles. Preferred tow fibers are bicomponent fibers having a PP or PE core with a polyethylene sheath. The tow fibers may have a denier per filament of 1.5 to 8.0 and a total crimped denier in the tow band of 15,000 to 95,000. Tow fibers are a component in Swifter® Dusters™ sold by the instant assignee.

The carrier sheet 12, precursor sheet 13 and tow fiber tuft(s) 15 may be joined by a plurality of permanent bonds 38. The bonds 38 are intended to minimize or prevent stray or dislodged tow fibers from becoming loose. Such sheets 12 and tow fiber tuft(s) 15 may typically be directly superimposed on one another, with or without intervening members or components therebetween. The bonds 38 may be ultrasonic bonds 38, adhesive 32 bonds 38, thermal bonds 38 or a combination thereof, as are known in the art.

Referring particularly to FIG. 1, the cleaning article 10 may have discrete tow fiber tufts 15 disposed in rows 30. The rows 30 of tufts 15 may be cascaded to form a grid of tufts 15. The rows 30 may be parallel to the transverse axis, and generally aligned in the back and forth direction in ordinary use. This arrangement provides the benefit that larger debris can be intercepted in the space between the rows 30 during ordinary use, while smaller debris is intercepted by the tufts 15.

While six parallel and equally spaced rows 30 are shown, the invention is not so limited. Prophetically from two to 15 rows 30 could be used, with equal or unequal spacing and equal or unequal width and equal or unequal tuft 15 density. The rows 30 may be mutually parallel to the transverse axis, mutually skewed thereto or be mutually skewed relative to other rows 30. Optionally, adhesive 32 may be disposed in the spaces 31 between the rows 30. The rows 30 may extend throughout the transverse direction as shown, or be interrupted at the longitudinal axis.

In one particularly nonlimiting embodiment the tufts 15 may be spaced on an inter-row pitch T1 of 1 to 3 cm, a center to edge tuft 15 distance T2 of 0.5 to 1.5 cm, and a transverse tuft 15 spacing T4 of 0.1 to 0.5 cm. The rows 30 may have a length in the transverse direction C1 of 8 to 16 cm and a spaced apart in the longitudinal direction C2 0.5 to 1.5 cm.

This geometry provides the benefit that when used with a common sized cleaning implement 70, such as the Swifter® Sweeper™ implement 70 sold by the instant assignee, the rows 30 and spaces 31 may wrap the nose of the head 74 of the cleaning implement. Wrapping the nose of the head 74 of the cleaning implement 70 is believed to improve cleaning along walls and baseboards.

Figure 2:
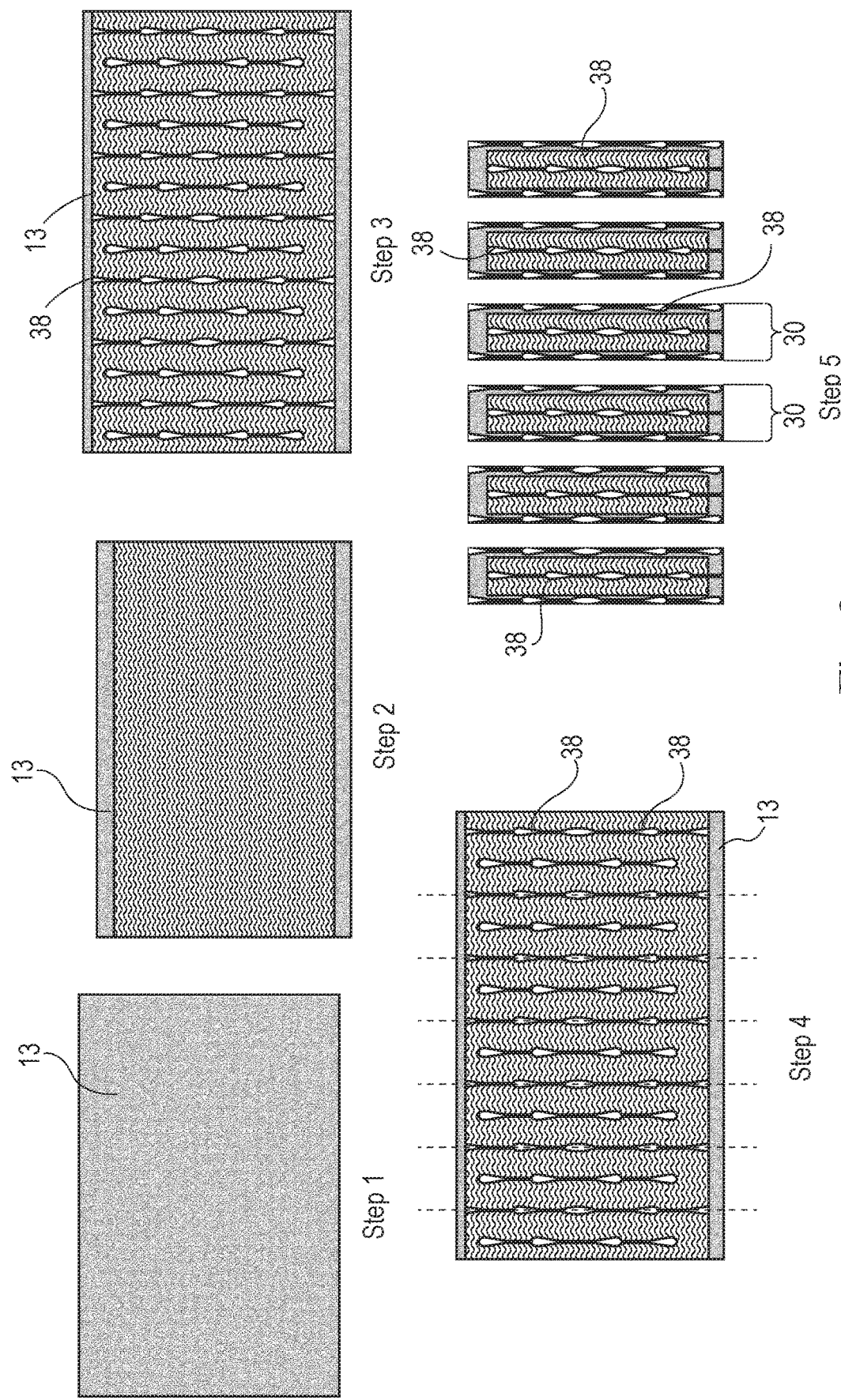
FIG. 2 is a schematic flow chart of a process usable to produce the cleaning article of FIG. 1.

Referring to FIG. 2, this cleaning article 10 may be made by providing a precursor sheet 13 as in Step 1. Tow fibers are stretched across the precursor sheet 13 in the longitudinal direction, as shown in Step 2. The tow fibers are bonded to the precursor sheet 13 in the transverse direction, as shown in Step 3. Tufts 15 are created by slitting the precursor sheet 13 between the bonds 38, as shown in Step 3. The precursor sheet 13 and tufts 15 are cut into discrete rows 30 and separated, as shown in Steps 4-5. A carrier sheet 12 is provided, as in Step 6. The carrier sheet 12 is coated with adhesive 32, as shown in Step 7. The rows 30 of tufts 15 are disposed on the carrier sheet 12 and held in place by the adhesive 32, as shown in Step 8. Optionally the tufts 15 may be fluffed with blowing air to enlarge the tufts 15, as in Step 9.

While four generally parallel and equally spaced rows 30 are shown, the invention is not so limited. Prophetically from two to 15 rows 30 could be used, with equal or unequal spacing and equal or unequal variable widths and equal or unequal tuft 15 density. The rows 30 may be mutually parallel to the transverse axis, mutually skewed thereto or be mutually skewed relative to other rows 30. Optionally, adhesive 32 may be disposed in the spaces 31 between the rows 30. The rows 30 may both extend throughout the transverse direction and be interrupted at the longitudinal axis. The tapered intra-tuft 15 spaces 31 between the tufts 15 provide the benefit that no tufts 15 are interrupted by the spaces 31. Thus all tufts 15 can be selected to be of a size large enough for efficacious cleaning.

In one particularly nonlimiting embodiment the spaces 31 may have an opening T1 of 1 to 3 cm. The rows 30 may have a width at the edge of the cleaning article 10 T2 of 0.5 to 1.5 cm, and width nearer the end of the space 31 T3 of 0.5 to 1 cm. A transverse tuft 15 spacing T4 of 0.1 to 0.5 cm may be used. The spaces 31 may have a length in the transverse direction C1 of 3 to 8 cm and be spaced apart in the longitudinal direction C2 0.5 to 1.5 cm. The rows 30 may be longitudinally separated by a distance S1 of 2 to 8 cm.

This geometry provides the benefit that when used with a common sized cleaning implement 70, such as the Swifter® Sweeper™ implement 70 sold by the instant assignee, the rows 30 and spaces 31 may wrap the nose of the head 74 of the cleaning implement. Wrapping the nose of the head 74 of the cleaning implement 70 is believed to improve cleaning along walls and baseboards. The amount of tufts 15 on the nose can be controlled by and is inversely proportional to the width of the spaces 31.

Referring generally to FIGS. 1-5.2, the tufts 15 may be disposed on a differential pitch. The pitch is the distance between centers of tufts 15 taken parallel to the longitudinal axis or parallel to the transverse axis. As shown on imaginary lines 99A and 99B, the pitch may change as the longitudinal axis is approached, providing a differential pitch, and thus a differential tuft 15 density. The pitch may increase, and density decrease, as a longitudinal edge (parallel to the longitudinal axis) is approached, or vice versa. This arrangement provides the benefit that debris is more easily entrapped and retained by the cleaning article 10.

If desired, a precursor sheet 13 having cutouts may be used without a carrier sheet 12. This arrangement provides the benefit of conserving material, but may sacrifice strength.

The pitch, and thus tuft 15 density, may be constant at any predetermined spacing from the longitudinal edge. The tufts 15 may be bilaterally staggered relative to the longitudinal axis and transverse axis. The tufts 15 may fully overlap the position of adjacent tufts 15, in both directions, to provide adequate spacing therebetween and debris retention during back and for the sweeping. Alternatively, each tuft 15 having a maximum diameter, or other maximum dimension taken parallel to the longitudinal axis, and the pitch between adjacent tufts 15 in a particular row 30 may be greater than the maximum diameter/dimension.

The cleaning article according may be tri-folded generally parallel to said longitudinal axis, as is common in the art. This arrangement provides two outboard trisections, commonly used for attachment to the head 74 of a cleaning implement. If desired, tufts 15 may be disposed in at least one of, and optionally both of, the outboard trisections, to provide for cleaning along walls and baseboards.

Referring particularly to FIGS. 3.1 and 3.2, the cleaning article 10 may have discrete tow fiber tufts 15 disposed in rows 30 with at least one longitudinal space 31 therebetween. The rows 30 may be parallel to the longitudinal axis, and generally aligned across the back and forth direction in ordinary use. This arrangement provides the benefit that larger debris can be intercepted in the space 31 between the rows 30 during ordinary use, while smaller debris is intercepted by the tufts 15. The space 31 between the rows 30 can be used to capture debris during turning to the side or by using a stomp motion at the end of a cleaning process. This arrangement provides efficacious hair pickup and is suitable for households having pets.

While two parallel and equally sized rows 30 are shown, the invention is not so limited. Prophetically from two to 10 rows 30 could be used, with equal or unequal spacing and equal or unequal width and equal or unequal tuft 15 density. The rows 30 may be of constant or variable width. The rows 30 may be mutually parallel to the longitudinal axis, mutually skewed thereto or be mutually skewed relative to other rows 30. Optionally, adhesive 32 may be disposed in the spaces 31 between the rows 30. The rows 30 may extend throughout the longitudinal direction as shown, or be interrupted at the transverse axis.

Figure 4:
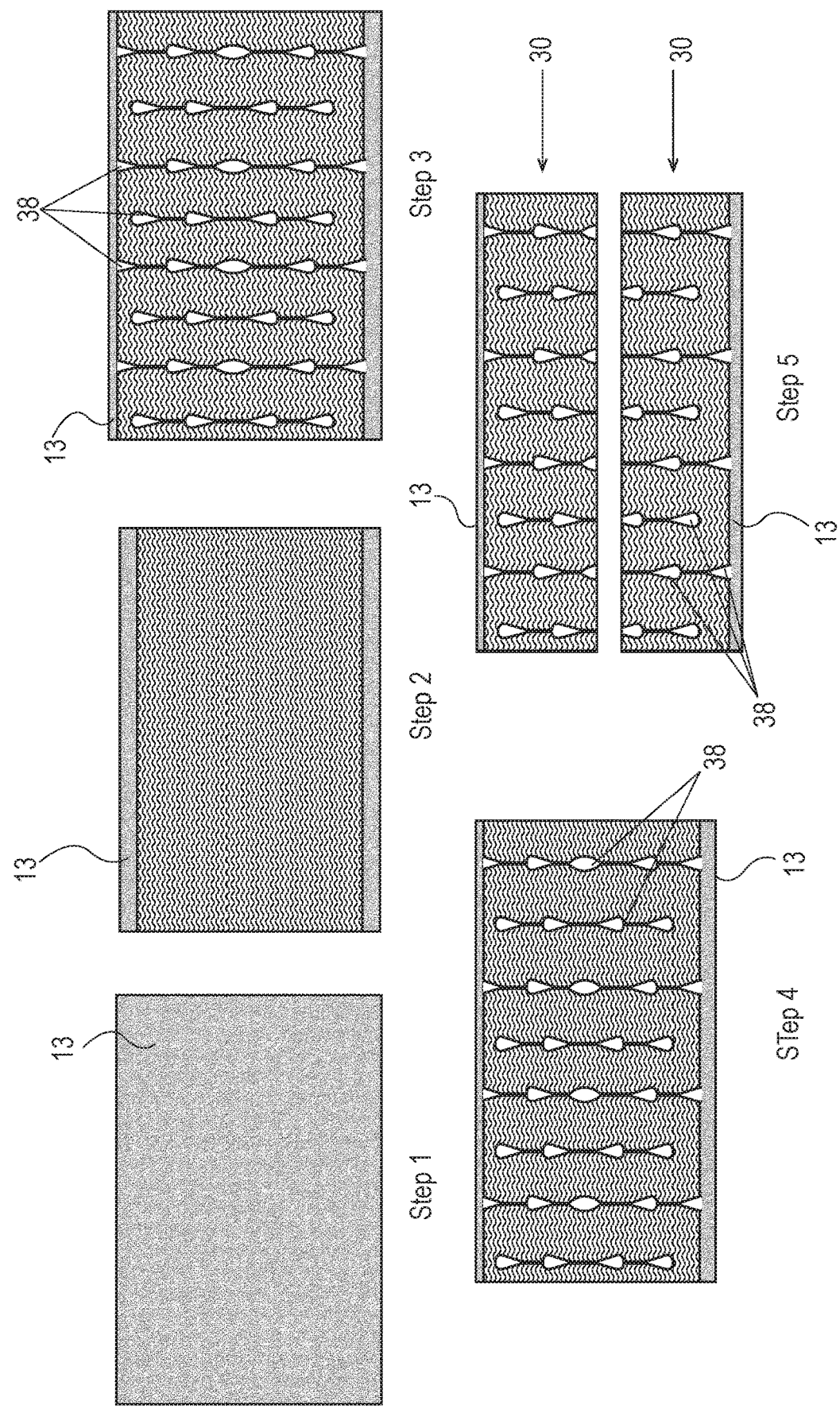
FIG. 4 is a schematic flow chart of a process usable to produce the cleaning article of FIG. 3.1.
Figure 4:
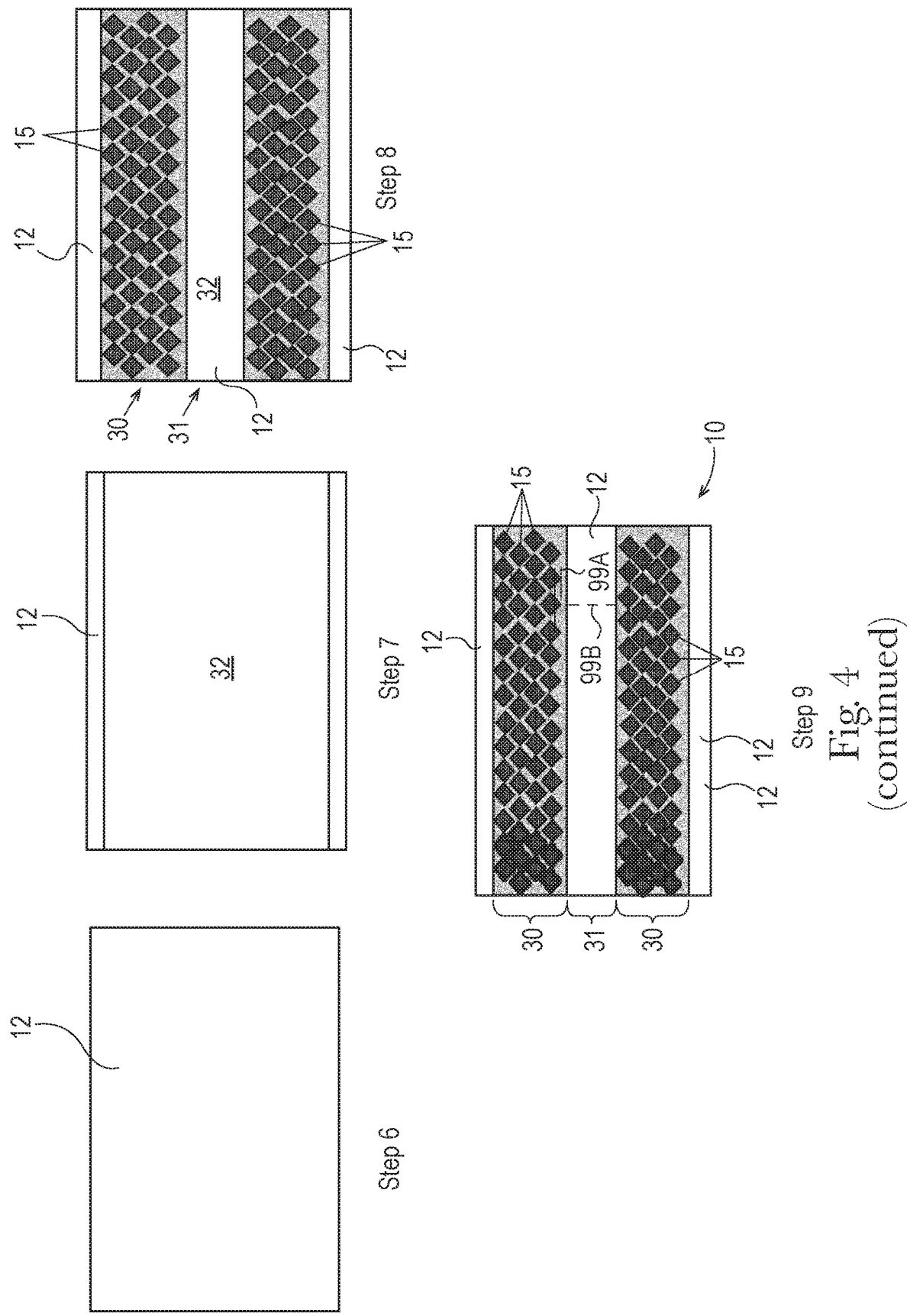

In one particularly nonlimiting embodiment with two rows 30, as shown in FIG. 4.1, the rows 30 may have a width S1 of 2 to 8 cm. The space 31 between the rows 30 S2 may be 1 to 4 cm. In one particularly nonlimiting embodiment with three rows 30, as shown in FIG. 4.2, the outboard rows 30 may have a width S1 of 1 to 8 cm. The center row 30 may have a width S3 of 1 to 6 cm. The space 31 between the rows 30 S2 may be 0.5 to 4 cm.

This geometry provides the benefit that when used with a common sized cleaning implement 70, such as the Swifter® Sweeper™ implement 70 sold by the instant assignee, the rows 30 and spaces 31 may wrap the nose of the head 74 of the cleaning implement. Wrapping the nose of the head 74 of the cleaning implement 70 is believed to improve cleaning along walls and baseboards. Wrapping the nose of the cleaning implement is believed to improve cleaning along walls and baseboards.

Referring to FIG. 4, the cleaning article 10 of FIG. 4.1 may be made by providing a precursor sheet 13 as in Step 1. Tow fibers are stretched across the precursor sheet 13 in the longitudinal direction, as shown in Step 2. The tow fibers are bonded to the precursor sheet 13 in the transverse direction, as shown in Step 3. Tufts 15 are created by slitting the precursor sheet 13 between the bonds 38, as shown in Step 3. The precursor sheet 13 and tufts 15 are cut into discrete rows 30 and separated, as shown in Steps 4-5. A carrier sheet 12 is provided, as in Step 6. The carrier sheet 12 is coated with adhesive 32, as shown in Step 7. The rows 30 of tufts 15 are disposed on the carrier sheet 12 and held in place by the adhesive 32, as shown in Step 8. Optionally the tufts 15 may be fluffed with blowing air to enlarge the tufts 15, as in Step 9.

Referring to FIG. 5.1, the cleaning article 10 may optionally have strips 17. The strips 17 have an aspect ratio of length to width greater than 1. Optionally, an elongate tow fiber rope oriented generally parallel to and optionally coincident the longitudinal axis LA may be used. A cleaning strip element 25 may be disposed partially on or throughout the longitudinal axis LA. A combination of intra-tuft 15 spaces 31 and trans-tuft 15 spaces 31 may be used to create rows 30 of constant width, variable width, equal and unequal spacing, parallel to the longitudinal axis, parallel to the transverse axis and skewed relative thereto.

Differential pitch may be achieved as a function of tuft 15 size. The tufts 15 may increase in size, and thus pitch, as the longitudinal axis is approached. Alternatively, the tufts 15 may maintain constant pitch relative to the longitudinal axis, and decrease in size as one or both longitudinal edges are approached. Thus the tufts 15 may increase in size and decrease in pitch as the longitudinal axis is approached. One tuft 15 may touch an adjacent tuft 15 or be spaced therefrom.

As shown in FIGS. 5.1 and 5.2, differential spacing between adjacent tufts 15 may simply be accomplished by disposing different tufts 15, and preferably rows thereof, on different pitches. This arrangement provides the benefit that the differential spacing may be obtained without complex and extraneous manufacturing steps. Preferably the differential pitch increases by at least 25%, 50%, 100% or 200% of the smaller pitch under consideration. This difference is believed to be suitable for entrapment of large debris, while a smaller difference may not be efficacious.

Referring particularly to FIG. 5.2 the differential pitch of the tufts 15 may be accomplished by differential spacing of the bonds 38. This arrangement advantageously results in different sizes of tufts 15. If the cuts are not aligned and the bonds 38 are aligned without an intervening cut, this arrangement advantageously also provides bridge portions of bonded tow fibers between the tufts 15.

Referring generally to any of FIGS. 1-5.2, any of the carrier sheet 12, precursor sheet 13 and/or tufts 15 15 of tow fibers may optionally be completely or partially coated with adhesive 32, wax, Newtonian oils and/or non-Newtonian oils or a combination thereof, in order to improve cleaning and increase retention of absorbed debris. Particularly, the tow fiber tuft 15, in any configuration, may be coated with a mineral oil coating. The coating may comprise a mixture of mineral oil and surfactant at a ratio of about 90% to 10% oil to surfactant. The surfactant provides the benefit inducing the oil to wet the tow fibers by reducing the surface energy. The surfactant may be a non-ionic surfactant.

The carrier sheet 12 and precursor sheet 13 may both comprise a nonwovens and be ultrasonically bonded. Or the carrier sheet 12 and precursor sheet 13 may be adhesively 32 bonded. This arrangement provides the benefit that if the carrier sheet 12 is adhesively 32 coated throughout, adhesive 32 will be disposed in the spaces 31 between the rows 30 and be available for collection and retention of debris.

The spaces 31 between the tufts 15 may range from 0.3, 0.5, 0.7, 1, 1.5 cm to 8, 7, 6, 5, or 4 cm, and particularly from 0.5 to 3 cm, 0.5 to 2.5 cm, 0.8 cm to 2 cm, or 1 to 1.5 cm or any range therebetween, and encompassing any of the aforementioned endpoints in any combination. A space 31 having this width between adjacent tufts 15 may form a lane between adjacent tufts 15 and is believed to be suitable for picking up large debris which is not always captured by the tow fibers. The lane may form a straight line, to allow entry of debris. The width of a space 31 is measured between the closest portions of adjacent tufts 15 when the tufts are in a normal configuration as lightly compressed against a target surface.

This spacing may provide a differential pitch between tufts 15. The differential pitch is measured in a straight line 99A, 99B between the centers of adjacent tufts 15 and is independent of the size of the tufts 15. The lines 99A, 99B may be parallel to the longitudinal axis LA, the transverse axis TA or skewed. The pitch may have a difference of at 25%, 50%, 100% or 200% of the smaller pitch under consideration to provide for efficacious collection of both large and small debris.

Figure 6C:
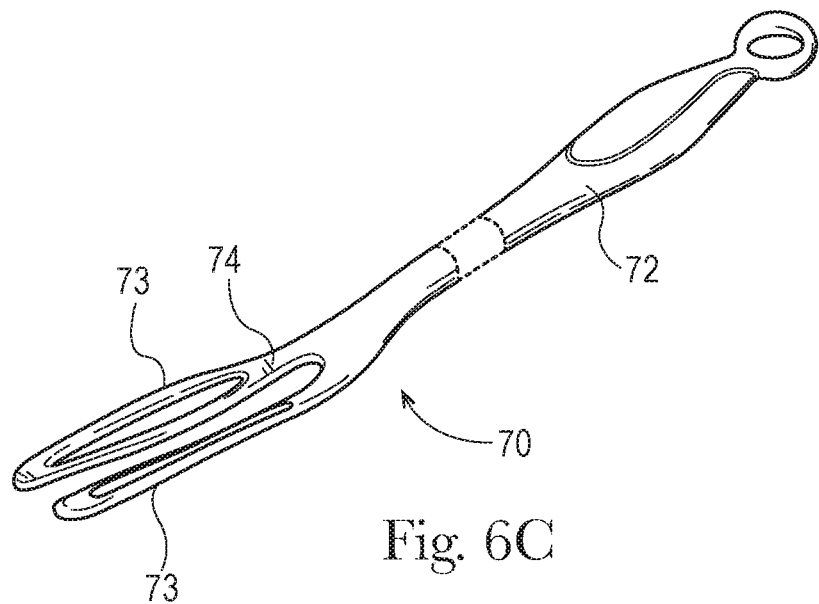
FIG. 6C is a perspective view of a handle suitable for use with a duster type cleaning article according to the claimed invention.
Figure 6B:
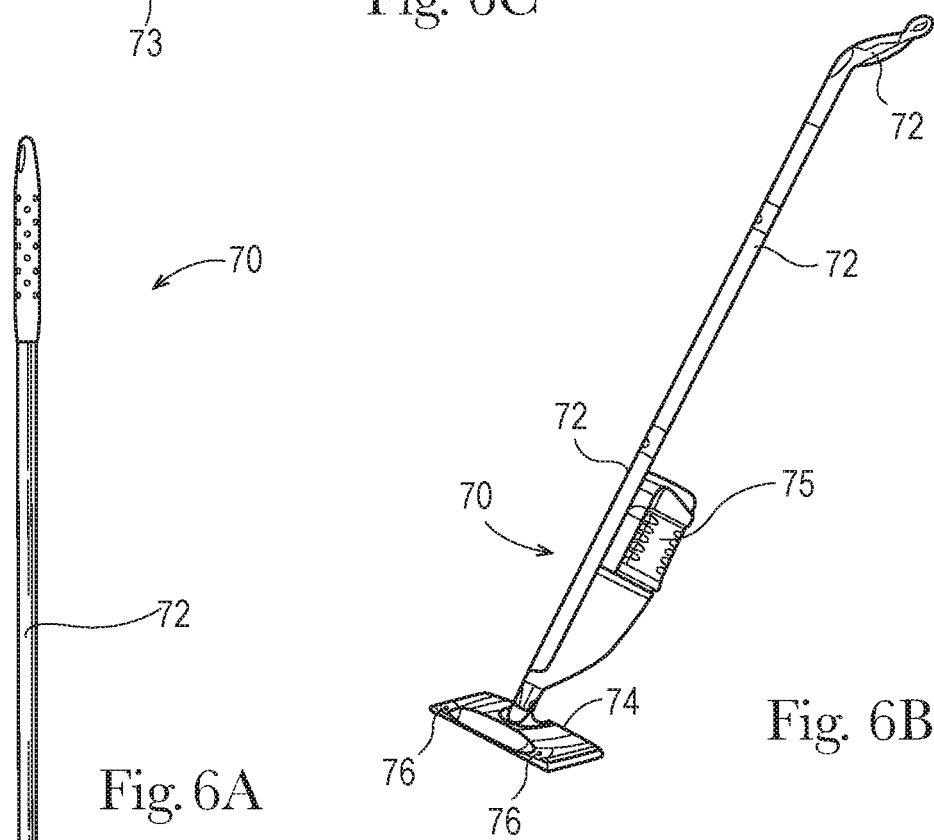
FIG. 6B is a perspective view of a floor cleaning implement suitable for use with the present invention and which sprays liquid cleanser on the floor.
Figure 6A:
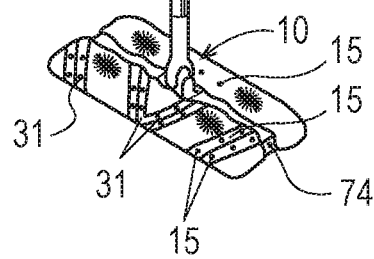
FIG. 6A is a perspective view of a floor cleaning implement suitable for use with the claimed invention and having a cleaning article attached thereto.

Referring to FIGS. 6A and 6B, the cleaning article 10 may be removably attachable to a cleaning implement 70 for use with dry, wet and/or prewetted cleaning, depending upon the particular task. The cleaning implement 70 may have a head 74 for receiving the cleaning article 10 and an elongate handle 72 joined thereto. A typical floor cleaning implement 70 has a handle 72 for grasping by the user and a head 74 attached thereto, and preferably pivotally attached thereto. The head 74 moves against the floor, or other target surface. The cleaning article 10 may be removably attached to the bottom of the head 74. An attachment system may provide for removable attachment of the cleaning article 10 to a suitable and optional handle 72. Removable attachment of the cleaning article 10 to the implement 70 may be accomplished using adhesive 32, hook and loop systems, elongate sleeves, grippers, etc. Grippers and a suitable cleaning implement 70 are disclosed in commonly assigned U.S. Pat. No. 6,484,356.

Referring to FIG. 6B, the cleaning article 10 may optionally be used with a cleaning solution or other solution usable for other purposes such as treating the surface for appearance or disinfectant, etc. A floor cleaning implement 70 may allow for cleaning of the floor while the user is upright, and may also provide for spraying of cleaning solution or other liquid to the floor from a reservoir 75 through one or more nozzles 76. Suitable spray implements 70 are disclosed in commonly assigned U.S. Pat. Nos. 5,888,006; 5,988,920; 6,842,936; 7,182,537; 7,536,743; 7,676,877 and 8,186,898. The cleaning solution may be pre-applied to the cleaning article 10, creating a pre-moistened cleaning article 10 or may be contained within a separate reservoir 75 for dosing onto the cleaning article 10 and/or target surface. The cleaning solution may comprise a majority water, and at least about 0.5, 2, 5 or 10 weight percent solids, or at least about 30 or 50 weight percent aqueous solvents, non-aqueous solutions or mixtures thereof. A suitable implement 70 having an optional vacuum is disclosed in U.S. Pat. No. 7,137,169.

Referring to FIG. 6C, the implement 70 may have a handle 72 and head 74 used in fixed relationship and comprising one or more tines 73. The tines 73 may be inserted into sleeves in the cleaning article 10. This arrangement allows the cleaning article 10 to be conveniently used as a duster for cleaning small object and tights spaces 31. Suitable implements 70 for a duster type cleaning article 10 are disclosed in commonly assigned U.S. Pat. No. 8,578,564 and D674,949 S.

If desired, the cleaning article 10 may be used with and removably attached to an autonomously moving robot or drone. Suitable examples of robots and drones for use with the cleaning article of the present invention are found in commonly assigned U.S. Pat. Nos. 6,941,199; 6,810,305; 6,779,217; 6,481,515; 6,459,955 and Ser. No. 14/992,195, filed Jan. 11, 2016, P&G Case 14189. Examples of robots for use with wet and dry cleaning are found in U.S. Pat. Nos. 7,389,156; 8,774,966 and 8,855,813. A data control system may be utilized with the cleaning article 10, as described in U.S. Pat. No. 7,431,524.

The cleaning article 10 may also be used manually, without a handle 72 or implement 70. If desired, various cleaning articles 10 described herein may be packaged and sold in a kit. This arrangement provides the benefit that the user has a choice of different cleaning articles 10 for different tasks. For example, if desired, plural sizes of the cleaning articles 10 may be sold together as a single kit. This arrangement allows the user to select the particular cleaning article 10 best suited for the immediate task.

The method may be carried out according to any of the following nonlimiting paragraphs in any combination.

A. A method of making a cleaning article having a longitudinal axis, said method comprising the steps of:
providing a precursor sheet having tow fibers disposed thereon,
bonding said tow fibers to said precursor sheet,
slitting said precursor sheet and said tow fibers to provide discrete tufts,
cutting said precursor sheet into a plurality of discrete portions, and
bonding at least some of said discrete portions of said precursor sheet and said tufts to a carrier sheet to provide a laminate with said tufts extending outwardly to form a cleaning article for cleaning a target surface with said tufts.

B. A method according to paragraphs A wherein said discrete portions are adhesively bonded to said carrier sheet.

C. A method according to paragraphs A and B wherein said discrete portions are adhesively bonded to said carrier sheet to provide spaces between said discrete portions.

D. A method according to paragraphs A, B and C wherein said discrete portions are adhesively bonded to said carrier sheet to provide spaces between said discrete portions with exposed adhesive disposed in said spaces.

E. A method according to paragraphs A, B, C and D wherein said precursor sheet comprises a nonwoven and said carrier sheet comprises a nonwoven.

F. A method according to paragraphs A, B, C, D and E wherein said precursor sheet comprises a nonwoven and said carrier sheet comprises a nonwoven and said carrier sheet and discrete portions are ultrasonically bonded.

G. A method of making a cleaning article having a longitudinal axis, said method comprising the steps of:
providing a precursor sheet having discrete tufts comprising tow fibers disposed thereon,
cutting said precursor sheet into a plurality of discrete portions, and
bonding at least some of said discrete portions of said precursor sheet and said tufts to a carrier sheet to provide a laminate with said tufts extending outwardly to form a cleaning article for cleaning a target surface with said tufts.

H. A method according to paragraph G wherein said discrete portions of said precursor sheet are cut into rows.

I. A method according to paragraphs G and H wherein said discrete portions of said precursor sheet are cut into rows, and said discrete portions are bonded to said carrier sheet in generally parallel rows.

J. A method according to paragraphs G, H and I wherein said discrete portions of said precursor sheet are cut into rows, and said discrete portions are bonded to said carrier sheet in rows generally parallel to said longitudinal axis.

K. A method according to paragraphs G, H, I and J wherein said discrete portions of said precursor sheet are cut into at least two rows, and said discrete portions are bonded to said carrier sheet in at least two said rows generally parallel to said longitudinal axis, said rows whereby at least one said row is disposed on each side of longitudinal axis, said longitudinal axis being free of said tufts.

L. A method according to paragraphs G, H and I wherein said discrete portions of said precursor sheet are cut into rows, and said discrete portions are bonded to said carrier sheet in rows generally perpendicular to said longitudinal axis, and having spaces between adjacent rows.

M. A method according to paragraphs G, H, I and L wherein said discrete portions of said precursor sheet are cut into rows, and said discrete portions are bonded to said carrier sheet in rows generally perpendicular to said longitudinal axis, and having spaces between adjacent rows, said spaces intercepting at least one said edge of said cleaning article.

N. A method according to paragraphs G, H, I, L and M wherein said discrete portions of said precursor sheet are cut into rows, and said discrete portions are bonded to said carrier sheet in rows generally perpendicular to said longitudinal axis, and having spaces between adjacent rows, said rows having generally constant width in the longitudinal direction.

O. A method of making a cleaning article having a longitudinal axis, said method comprising the steps of:
providing a precursor sheet having two spaced apart longitudinal edges and discrete tufts of tow fibers disposed on,
cutting said precursor sheet into a plurality of discrete portions, and
adhesively bonding at least some of said discrete portions of said precursor sheet and said tufts to a carrier sheet to provide a laminate with said tufts extending outwardly to form a cleaning article for cleaning a target surface with said tufts, a first plurality of said tufts having a first pitch taken parallel to said longitudinal axis, a second plurality of tufts having a second pitch taken parallel to said longitudinal axis, said first pitch being greater than said second pitch.

P. A method according to paragraph O wherein said first plurality of tufts having said first pitch is disposed closer to said longitudinal edge than said second plurality of tufts having said second pitch.

Q. A method according to paragraphs O and P wherein said discrete portions are cut into equal sizes.

R. A method according to paragraphs O, P and Q wherein said discrete portions are cut into equal sizes and are disposed on said carrier sheet in rows.

S. A method according to any preceding paragraph wherein said discrete portions are spaced apart and have adhesive on said carrier sheet therebetween, said adhesive being exposed whereby said adhesive can collect and retain debris from a target surface.

T. A method according to any preceding paragraph wherein at least some of said tufts disposed on said precursor sheet are unequally spaced from adjacent tufts disposed on said carrier sheet.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm" and a pressure disclosed as "about 1100 kPa" is intended to include 1103.2 kPa.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern. All limits shown herein as defining a range may be used with any other limit defining a range. That is the upper limit of one range may be used with the lower limit of another range, and vice versa.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A method of making a cleaning article having a longitudinal axis, said method comprising the steps of:
providing a precursor sheet having tow fibers disposed thereon,
bonding said tow fibers to said precursor sheet,
slitting said precursor sheet and said tow fibers to provide discrete tufts,
cutting said precursor sheet into a plurality of discrete portions, and
bonding at least some of said discrete portions of said precursor sheet and said tufts to a carrier sheet to provide a laminate with said tufts extending outwardly to form a cleaning article for cleaning a target surface with said tufts,
wherein said discrete portions are adhesively bonded to said carrier sheet to provide spaces between said discrete portions with exposed adhesive disposed in said spaces.

2. A method according to claim 1 wherein said precursor sheet comprises a nonwoven sheet and said carrier sheet comprises a second nonwoven sheet.

3. A method of making a cleaning article having a longitudinal axis, said method comprising the steps of:
providing a precursor sheet having discrete tufts comprising tow fibers disposed thereon, cutting said precursor sheet into a plurality of discrete portions, and
bonding at least some of said discrete portions of said precursor sheet and said tufts to a carrier sheet to provide a laminate with said tufts extending outwardly to form a cleaning article for cleaning a target surface with said tufts,
wherein said discrete portions are adhesively bonded to said carrier sheet to provide spaces between said discrete portions with exposed adhesive disposed in said spaces.

4. A method according to claim 3 wherein said discrete portions of said precursor sheet are cut into rows.

5. A method according to claim 3 wherein said discrete portions of said precursor sheet are cut into rows, and said discrete portions are bonded to said carrier sheet in generally parallel rows.

6. A method according to claim 3 wherein said discrete portions of said precursor sheet are cut into rows, and said discrete portions are bonded to said carrier sheet in rows generally parallel to said longitudinal axis.

7. A method according to claim 3 wherein said discrete portions of said precursor sheet are cut into at least two rows, and said discrete portions are bonded to said carrier sheet in at least two said rows generally parallel to said longitudinal axis, said rows whereby at least one said row is disposed on each side of longitudinal axis, said longitudinal axis being free of said tufts.

8. A method of making a cleaning article having a longitudinal axis, said method comprising the steps of:
providing a precursor sheet having two spaced apart longitudinal edges and discrete tufts of tow fibers disposed on,
cutting said precursor sheet into a plurality of discrete portions, and
adhesively bonding at least some of said discrete portions of said precursor sheet and said tufts to a carrier sheet to provide a laminate with said tufts extending outwardly to form a cleaning article for cleaning a target surface with said tufts, a first plurality of said tufts having a first pitch taken parallel to said longitudinal axis, a second plurality of tufts having a second pitch taken parallel to said longitudinal axis, said first pitch being greater than said second pitch.

9. A method according to claim 8 wherein said discrete portions are cut into equal sizes.

10. A method according to claim 8 wherein said discrete portions are cut into equal sizes and are disposed on said carrier sheet in rows.

11. A method according to claim 8 wherein said discrete portions are spaced apart and have adhesive on said carrier sheet therebetween, said adhesive being exposed whereby said adhesive can collect and retain debris from a target surface.

* * * * *